UNITED STATES PATENT OFFICE 2,394,660

PROCESS OF SULPHATING ALUMINUM ORE

Robert L. Brown, Atlanta, Ga., assignor to Hercules Powder Company, Wilmington, Del., a corporation of Delaware No Drawing. Application May 23, 1942, Serial No. 444,288

6 Claims. (Cl. 23—123)

This invention relates to the production of aluminum sulphate. More particularly, it is concerned with an improved method of producing aluminum sulphate.

In the manufacture of commercial aluminum sulphate, the aluminum ore, preferable bauxite, is reacted with sulphuric acid under suitable conditions, and a solution of aluminum sulphate is formed. The aluminum ore used usually contains non-sulphatable, water-insoluble impurities, and other impurities such as iron in combined form in the ferric state. As a result of the sulphating reaction, the iron bearing components become converted to ferric sulphate. Ferric sulphate is reddish-brown in color and unless converted to ferrous sulphate imparts an undesirable color to the aluminum sulphate.

In producing aluminum sulphate from an aluminum ore, such as Bauxite, the ore is treated with sulphuric acid at elevated temperatures until the ore is thoroughly digested, and a heavy viscous solution of aluminum sulphate is formed. The aluminum sulphate solution usually is then diluted and any insoluble material which separates as a sludge is removed by sedimentation processes from the aluminum sulphate solution. Considerable difficulty is experienced in separation of the sludge due to the slowness with which it settles. This is particularly a difficulty when low-grade ores are used. The aluminum sulphate is recovered from the solution by a process of concentration.

Now in accordance with this invention it has been discovered that an important improvement in aluminum sulphate production may be provided by treating the aluminum sulphate before the insoluble material or sludge is removed, with an aqueous solution of a reaction product of sulphur and caustic alkali. Such a reaction product serves to reduce the ferric sulphate to ferrous sulphate and also greatly accelerates the settling rate of the sludge from the solution of aluminum sulphate.

In carrying out this invention the aluminum sulphate solution which is obtained from the sulphation of the aluminum ore with sulphuric acid with or without dilution to a suitable concentration is treated with an aqueous solution of a reaction product of sulphur and aqueous caustic alkali produced by reacting these materials together in the presence of heat. The treated solution of aluminum sulphate is then allowed to settle, and the insoluble material removed by any suitable means. The remaining clear aluminum sulphate solution is concentrated and the aluminum sulphate recovered, as by crystallization or slabbing. The aluminum sulphate prepared by this improved process has a better appearance and is particularly suitable for use in paper mills, textile mills, water purification, etc. The ferric salts present in the original solution are reduced to ferrous salts. In addition, treatment of the aluminum sulphate solution with the reaction product of sulphur and caustic alkali accelerates the settling of the insoluble or sludge material more effectively than has heretofore been known. This not only permits a saving of time, but permits the use of poorer grades of aluminum ore than heretofore have been capable of use.

Now having indicated in a general way the nature and purposes of this invention, the following examples will illustrate the invention and are not to be construed as limiting the same.

Example 1

Two hundred and fifty parts of digested aluminum sulphate solution which have been diluted to 30° Baumé containing sludge were heated to 75° C. To this solution were added 4 parts of an aqueous solution of a reaction product of sulphur and caustic soda prepared as follows: 20 parts of sulphur, 20 parts of caustic soda and 20 parts of water were boiled together for 15 minutes. The resulting solution of reaction product of sulphur and caustic soda was diluted with 480 parts of water.

The digested aluminum sulphate solution before treatment with the solution of the reaction product of sulphur and caustic soda contains .25% ferric oxide based on the solid aluminum sulphate.

The aluminum sulphate produced by this process analyzed as follows:

| | Per cent |
|---|---|
| Free $Al_2O_3$ | .60 |
| Total $Al_2O_3$ | 17.03 |
| $Al_2(SO_4)_3$ | 55.14 |
| $SO_3$ | 39.10 |
| Insoluble | .07 |
| $Fe_2O_3$ | .02 |
| FeO | .33 |
| Total iron as Fe | .27 |

The aluminum sulphate produced had a greatly improved color. The rate of settling was greatly accelerated.

Example 2

In a continuous system of producing aluminum sulphate in which the rate of production of aluminum sulphate is 3000 lbs./hour, an aqueous solution of the reaction product made by boiling together 3½ lbs. of sulphur, 3½ lbs. of caustic soda and 3⅓ lbs. of water was introduced intimately into the aluminum suphate solution, and diluted to 32° Baumé prior to going to the settling tank, at such a uniform rate as to require one hour for addition of the above amount.

The aluminum sulphate produced by this method had a greatly improved color. The rate of settling was greatly accelerated.

In Example 1 sodium hydroxide (caustic soda) has been shown as the caustic alkali. Other caustic alkali may be used, such as potassium hydroxide, lithium hydroxide and the like. The proportion of sulphur to caustic alkali may be varied, but a convenient and efficient ratio has been found to be 1 to 1. The ratio may be varied from 2 of caustic alkali and 1 of sulphur to 1 of caustic alkali and 1⅓ of sulphur. This mixture may be diluted with water to any convenient concentration for use.

The amount of reagent to be used will vary with different aluminum sulphate solutions and will depend to a certain extent on the grade of ore used in producing the aluminum sulphate solution. It has been found that a satisfactory amount of reagent to be used may be based on the amount of iron present, sufficient reagent being used to correspond to about one part of sulphur for about one and a half parts of the iron present calculated as the oxide. However, greater or smaller amounts than the above may be used.

In producing the aluminum sulphate solution used in practicing this invention, the reaction of the aluminum ore with sulphuric acid is carried out in a digestor or sulphator at elevated temperatures, preferably around 105–110° as is well known in the art. The length of time necessary to complete the digestion varies from about five hours to more than 20 hours. The operation is carried out either as a batch system or as a continuous system. After the sulphation of the aluminum ore is complete, the resulting heavy viscous aluminum sulphate solution may be diluted with water or weak aluminum sulphate solution derived from counter-current washings of the sludge to any convenient concentration for use. While the improved process of this invention is equally suitable for use with a digested solution of aluminum sulphate irrespective of the method or manner by which it had been prepared, a convenient, efficient manner for sulphating the aluminum ore is shown in my U. S. Patent 2,273,930.

After treatment with the reaction product of sulphur and caustic alkali, the sludge is allowed or forced to settle and the clear aluminum sulphate liquid is run off, and as is frequently desired the residue remaining in the settling tank may be leeched with water to remove any soluble aluminum sulphate. The washings of this sludge or residue may be used if so desired to dilute the viscous aluminum sulphate after digestion but before settling or to grind the bauxite before sulphation. The clear aluminum sulphate liquor is then concentrated by any of the known methods and the aluminum sulphate recovered, as by crystallization or slabbing. The color of of the aluminum sulphate is improved and the iron present is substantially completely in the ferrous stage.

From the foregoing description it will be seen that the new and improved step comprising treating the aluminum sulphate solution before the insoluble materials are removed, with an aqueous solution of a reaction product of sulphur and caustic alkali has provided an efficient means for reducing the ferric salts present in the solution to ferrous salts and thus has made it possible to obtain a product having a greatly improved color. A further important advantage is evident in the acceleration of the rate of settling of the insoluble materials. By practicing the process of this invention, the rate of settling of the insoluble material has been accelerated to a rate hitherto unknown. In addition, a smaller compaction volume results. This results not only in a greater recovery of aluminum sulphate from the sludge, but gives greater production capacity in a given wash system. Further advantages result in the fact that poorer grades of aluminum ore hitherto impractical for use because of their slow settling rate, may now be used with good results.

What I claim and desire to protect by Letters Patent is:

1. In a process of preparing aluminum sulphate involving treating an aluminum ore with sulphuric acid at elevated temperatures until the ore is digested and a solution of aluminum sulphate is formed, settling insoluble material from the solution and removing the settled material, the step which comprises treating the aluminum sulphate solution before insoluble material is separated with an aqueous solution of the complex product obtained by reaction of 1 to 2 parts of alkali metal hydroxide with 1 to 1⅓ parts of sulphur in the presence of water at an elevated temperature.

2. In a process of preparing aluminum sulphate involving treating an aluminum ore with sulphuric acid at elevated temperatures until the ore is digested and a solution of aluminum sulphate is formed, settling insoluble material from the solution and removing the settled material, the step which comprises treating the aluminum sulphate solution before insoluble material is separated with an aqueous solution of the complex product obtained by reaction of 1 to 2 parts of sodium hydroxide with 1 to 1⅓ parts of sulphur in the presence of water at an elevated temperature.

3. In a process of preparing aluminum sulphate involving treating an aluminum ore with sulphuric acid at elevated temperatures until the ore is digested and a solution of aluminum sulphate is formed, settling insoluble material from the solution and removing the settled material, the step which comprises treating the aluminum sulphate solution before insoluble material is separated with an aqueous solution of the complex product obtained by reaction of 1 to 2 parts of potassium hydroxide with 1 to 1⅓ parts of sulphur in the presence of water at an elevated temperature.

4. In a process of preparing aluminum sulphate involving treating an aluminum ore with sulphuric acid at elevated temperatures until the ore is digested and a solution of aluminum sulphate is formed, settling insoluble material from the solution and removing the settled material, the step which comprises treating the aluminum sulphate solution before insoluble material is separated with an aqueous solution of the complex product obtained by reaction of 1 part of sodium hydroxide with 1 part of sulphur in the presence of water at an elevated temperature.

5. In a process of preparing aluminum sulphate involving treating an aluminum ore with sulphuric acid at elevated temperatures until the ore is digested and the solution of aluminum sulphate is formed, settling insoluble material from the solution and removing the settled material, the step which comprises treating the aluminum sulphate solution before insoluble material is separated with an aqueous solution of the complex product obtained by reaction of 1 part of potassium hydroxide with 1 part of sulphur in the presence of water at an elevated temperature.

6. In a process of preparing aluminum sulphate involving treating an aluminum ore with sulphuric acid at elevated temperatures until the ore is digested and a solution of aluminum sulphate is formed, settling insoluble material from the solution and removing the settled material, the step which comprises treating the aluminum sulphate solution before insoluble material is separated with an aqueous solution of the complex product obtained by reaction of 1 part of alkali metal hydroxide with 1 part of sulphur in the presence of water at an elevated temperature.

ROBT. L. BROWN.

Certificate of Correction

Patent No. 2,394,660. February 12, 1946.

ROBERT L. BROWN

It is hereby certified that errors appear in the printed specification of the above numbered patent requiring correction as follows: Page 1, second column, line 26, for "75%° C." read $75°\ C.$; page 2, first column, line 5, for "3½ lbs." read $3½\ lbs.$; line 75, for "stage" read $state$; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.* sodium hydroxide with 1 part of sulphur in the presence of water at an elevated temperature.

5. In a process of preparing aluminum sulphate involving treating an aluminum ore with sulphuric acid at elevated temperatures until the ore is digested and the solution of aluminum sulphate is formed, settling insoluble material from the solution and removing the settled material, the step which comprises treating the aluminum sulphate solution before insoluble material is separated with an aqueous solution of the complex product obtained by reaction of 1 part of potassium hydroxide with 1 part of sulphur in the presence of water at an elevated temperature.

6. In a process of preparing aluminum sulphate involving treating an aluminum ore with sulphuric acid at elevated temperatures until the ore is digested and a solution of aluminum sulphate is formed, settling insoluble material from the solution and removing the settled material, the step which comprises treating the aluminum sulphate solution before insoluble material is separated with an aqueous solution of the complex product obtained by reaction of 1 part of alkali metal hydroxide with 1 part of sulphur in the presence of water at an elevated temperature.

ROBT. L. BROWN.

Certificate of Correction

Patent No. 2,394,660. February 12, 1946.

ROBERT L. BROWN

It is hereby certified that errors appear in the printed specification of the above numbered patent requiring correction as follows: Page 1, second column, line 26, for "75%° C." read $75°$ $C.$; page 2, first column, line 5, for "3½ lbs." read $3½$ $lbs.$; line 75, for "stage" read $state$; and that the said Letters Patent should be read with these corrections therein that the same may conform to the record of the case in the Patent Office.

Signed and sealed this 30th day of April, A. D. 1946.

[SEAL]

LESLIE FRAZER,
*First Assistant Commissioner of Patents.*